United States Patent [19]
Haydu

[11] Patent Number: 4,789,165
[45] Date of Patent: Dec. 6, 1988

[54] PRESSURE COMPENSATING SEAL

[75] Inventor: Bartley A. Haydu, Anderson, Ind.

[73] Assignee: General Motors Corporation, Detroit, Mich.

[21] Appl. No.: 121,036

[22] Filed: Nov. 16, 1987

[51] Int. Cl.⁴ .............................. F16J 9/00; B60Q 1/06
[52] U.S. Cl. ......................................... 277/12; 362/65
[58] Field of Search ............... 277/12; 362/65; 74/529

[56] References Cited
U.S. PATENT DOCUMENTS

| | | | |
|---|---|---|---|
| 2,674,194 | 4/1954 | Arlitunoff | 103/87 |
| 3,469,862 | 9/1969 | Conibeer | 285/41 |
| 3,710,093 | 1/1973 | Riehl | 362/65 |
| 4,380,789 | 4/1983 | Craig | 362/65 |

Primary Examiner—Donald A. Griffin
Attorney, Agent, or Firm—Patrick M. Griffin

[57] ABSTRACT

A seal for use between the edge of a housing opening and a cover attached to the opening has an outer gasket portion that substantially blocks the seam between the cover and the housing opening and edge, and an inner expandable and contractible portion that compensates for potential pressure differentials, thereby preventing ambient air from being drawn in through the seam.

2 Claims, 3 Drawing Sheets

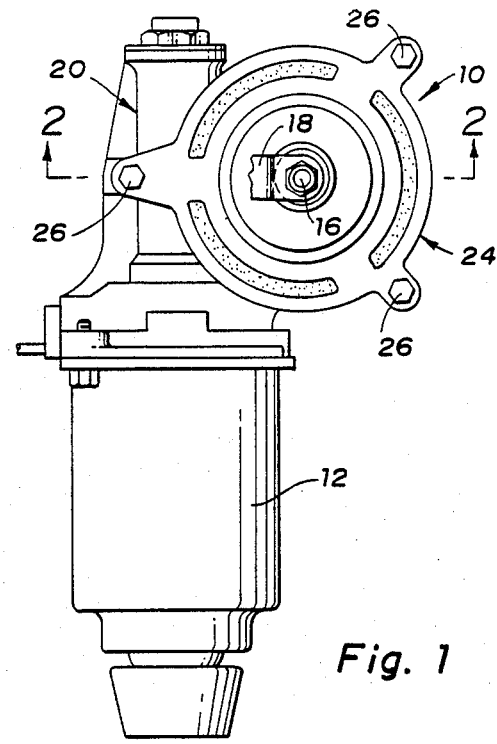
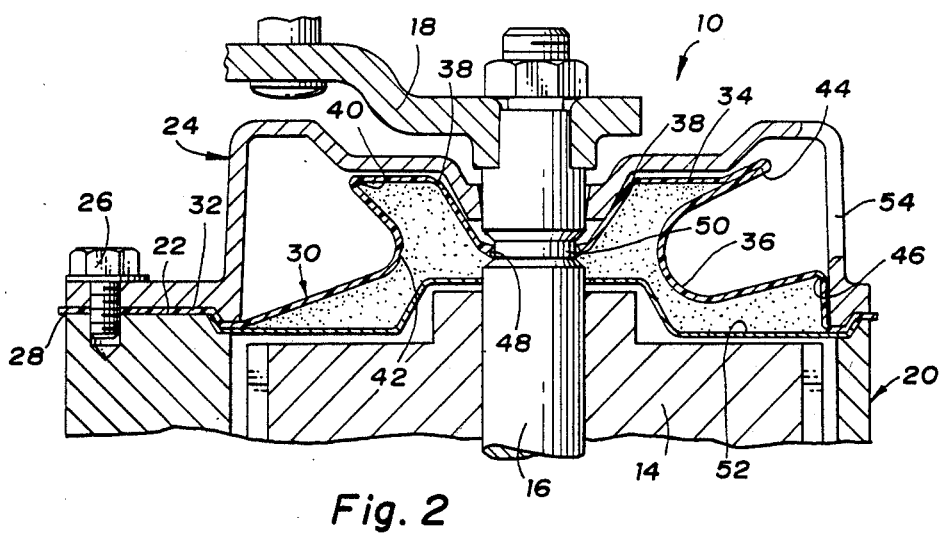

PRESSURE COMPENSATING SEAL

This invention relates to seals in general, and specifically to an improved seal for use between a housing and cover that better prevents the entrance of ambient air or water at the seam between the housing and cover.

BACKGROUND OF THE INVENTION

Retractable headlights in a vehicle are opened and closed by motor and gear mechanism contained within a housing. While the mechanism runs for very little total time over the life of the vehicle, its housing has a constant exposure to the ambient, from which it must be sealed in order to protect the motor. As a practical matter, the housing needs an opening with a removable cover to allow easy access for installation of the motor. As a consequence, there is a seam between the edge of the housing opening and the cover, which represents a potential leak path from the ambient to the internal volume of the housing, and which must be sealed. The conventional seal is a simple gasket clamped between the cover and housing to fill and block the seam. Complicating the sealing task, however, is the fact that the internal volume of the housing is subject to fairly large temperature differentials relative to ambient, due to the heating of the motor, and temperature changes in the ambient itself. The consequent relative expansion and contraction of the air within the housing can lead to a pressure differential relative to ambient. While positive pressure differentials caused by heating of the air in the enclosed volume are not generally a problem, the negative pressure differential that occurs afterward due to cooling can tend to draw ambient air, and thus water vapor, through the seam. Conventional gasket seals do nothing to compensate for this potential pressure differential.

SUMMARY OF THE INVENTION

The invention provides an improved seal for use in the type of environment described above that does compensate for and substantially prevents such pressure differentials. The preferred embodiment disclosed is a unitary member that has a peripheral gasket portion in the form of a flange that is sized so as to be tightly clamped between the housing edge and cover. This substantially blocks the seam, but does nothing by itself to compensate for the potential pressure differentials described above. The seal of the invention also has an inner portion integral with the gasket portion which is located generally between the housing and cover when the gasket portion is clamped in place. The seal inner portion encloses the internal volume of the housing and faces the inside of the cover. The seal inner portion is also expandable and contractible. Specifically, in the embodiment disclosed, the seal inner portion has one or more bulge portions defined therein at which the expansion and contraction of the seal is concentrated. In the unexpanded, normal state, each bulge portion has a concave shape relative to the seal and a convex shape when in the expanded state.

The cover, rather than being continuous as when a conventional gasket seal is used, has openings therethrough, one for each seal bulge portion, sized similarly to and aligned with each seal bulge portion. These openings are also sufficiently large that the inner portion of the seal is well exposed to ambient pressure. When the temperature differentials described above cause the air in the enclosed volume to expand, the seal bulge portions can simultaneously expand from the concave to the convex shape out the cover openings, substantially increasing the effective enclosed volume. This substantially prevents the occurrence of a positive pressure differential between the enclosed volume and the ambient. The shape change in the bulge portion as it expands out the opening in the cover also cooperates to efficiently expel any ambient water that might have collected in the bulge portion while it was unexpanded and concave in shape. The bulge can then return to its original shape when the air within the enclosed volume cools, substantially preventing a negative pressure differential between the enclosed volume and the housing, which could otherwise tend to draw ambient air or water in at the seam.

It is, therefore, a general object of the invention to provide a seal for use between a housing and a cover that compensates for potential pressure differentials between the enclosed volume and ambient that can occur when the air in the enclosed volume heats and cools, thereby preventing the consequent tendency for ambient air and water to be drawn through the seam between the housing and cover.

It is another object of the invention to provide such a seal that is a unitary member with an outer gasket portion clamped in the seam to substantially block the seam, and an expandable and contractible inner portion that allows the effective enclosed volume to increase and decrease, thereby substantially preventing the pressure differentials.

It is yet another object of the invention to provide such a seal that has bulge portions which expand from a concave to a convex shape out openings provided through the cover, thereby changing the effective enclosed volume to compensate for and substantially prevent pressure differentials as well as expelling ambient water that may have collected in the bulge portions while contracted.

DESCRIPTION OF THE PREFERRED EMBODIMENT

These and other objects and features of the invention will appear from the following written description, and from the drawings, in which:

FIG. 1 shows the electric motor and covered gear housing of a retractable headlight drive mechanism incorporating a preferred embodiment of the seal of the invention;

FIG. 2 is a cross section of the gear housing and cover showing the seal of the invention showing its normal, unexpanded state;

Figure 3:
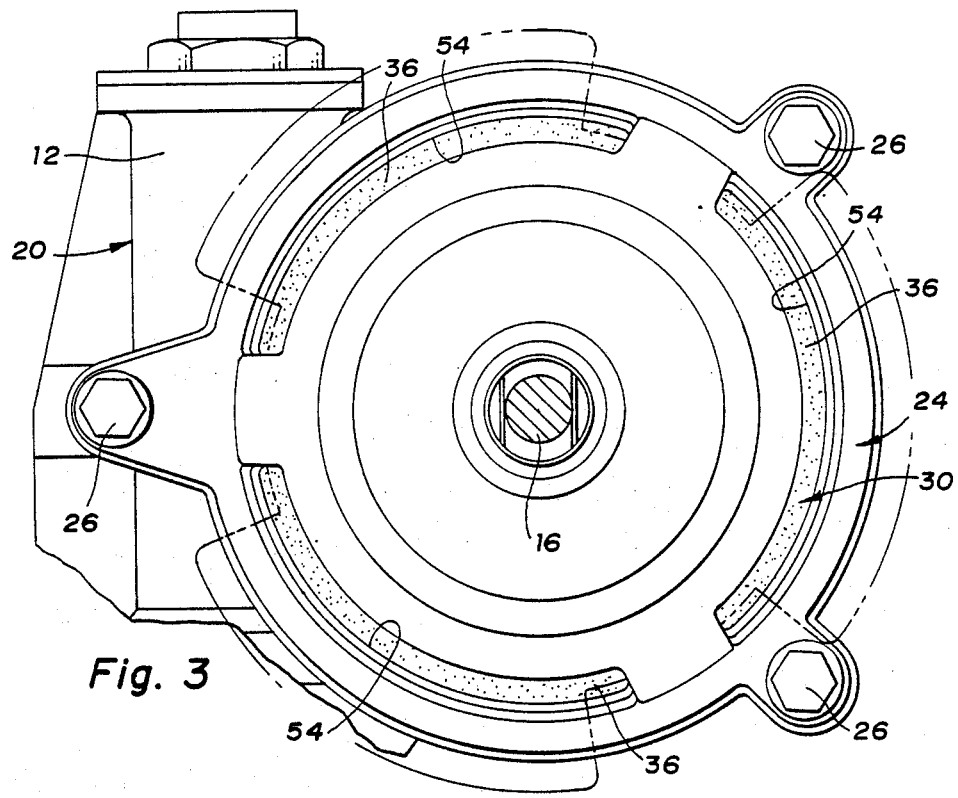
FIG. 3 is an end view of the housing and cover, and showing part of the seal in the expanded state in dotted lines.

Referring first to FIGS. 1 and 2, the invention is incorporated in a retractable headlight drive mechanism, indicated generally at 10, which includes an electric motor 12 that drives a worm gear 14 fixed to a shaft 16. A crank 18 fixed to shaft 16 would directly operate the headlight covers, which are not shown. Worm gear 14 and shaft 16 are contained and protected within a cylindrical housing indicated generally at 20, and turn as one on suitable bearings, not illustrated. As a practical matter, housing 20 cannot, be made as a seamless unit, but has to be open at an end in order to be able to install the shaft 16. The opening is generally circular, defined by an annular edge 22. A dish shaped cover, indicated generally at 24 is attached to edge 22 by bolts 26 or other suitable fasteners, creating a seam 28. Shaft 16 must extend centrally through cover 24. In a conventional configuration, the interior volume of housing 20 would be sealed and separated from ambient by cover 24 and by a simple annular gasket clamped in seam 28. Again, as described above, the air within the interior of housing 20 is subject to temperature differentials relative to the ambient air. Differentials of the pressure internal to housing 20, relative to ambient pressure, both positive and negative, are therefore possible. A negative pressure differential could tend to draw ambient air and water vapor in through seam 28, which a conventional gasket seal does not compensate for.

Figure 4:
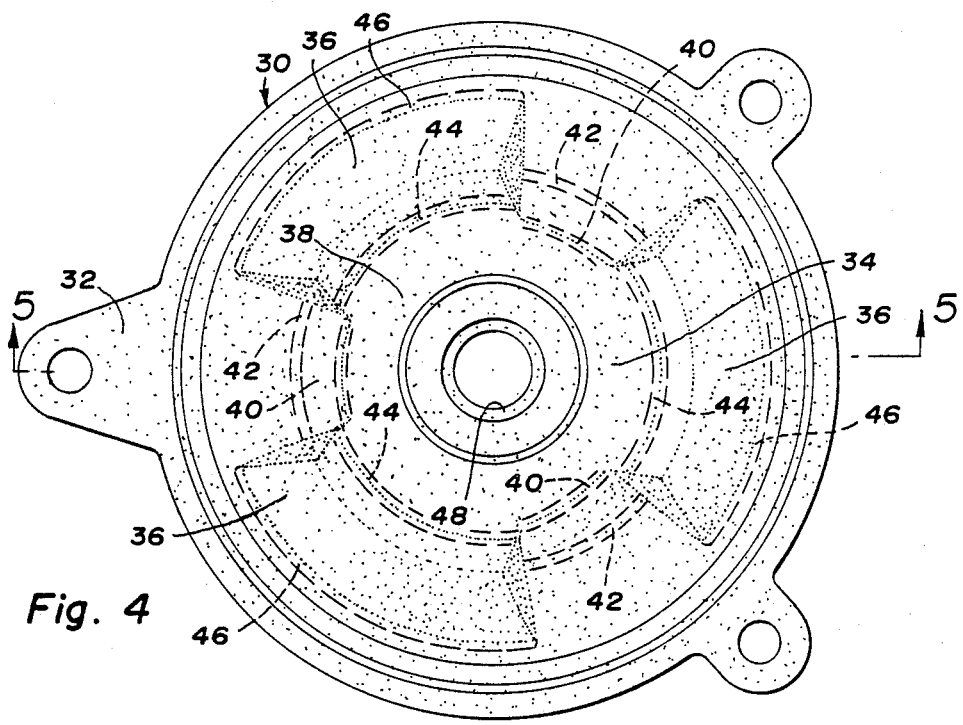
FIG. 4 is a top view of just the seal of the invention, separate from its environment, shown in its free molded shape.
Figure 5:
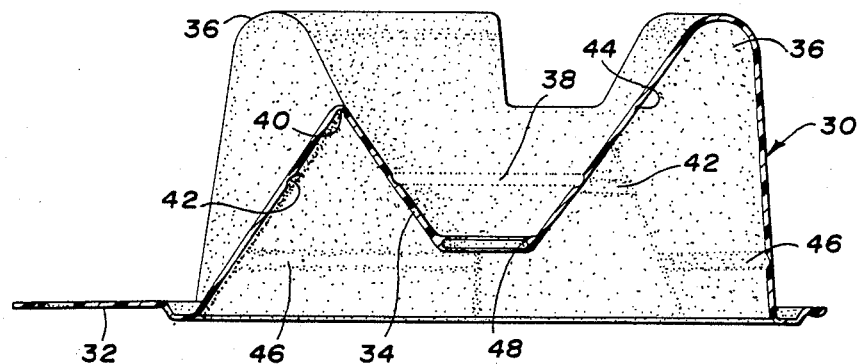
FIG. 5 is a cross-sectional view taken along the line 5—5 of FIG. 4.

Referring next to FIGS. 4 and 5, the seal of the invention, a preferred embodiment of which is designated generally at 30, is a unitary molded piece, made of neoprene or other suitable material, and is shown in its free molded shape. Seal 30 is also generally dish shaped, with a peripheral, annular gasket portion 32 and an inner portion 34 that is generally expandable and contractible. Specifically, in the embodiment disclosed, the seal inner portion 32 is molded with three evenly circumferentially spaced bulge portions 36, each of which occupies an arc of approximately 80 degrees and stands higher than the remainder of the seal inner portion 34. Several narrow flex concentration grooves are molded into both the inner and outer surfaces of seal 30, and are numbered consecutively, moving in the radial outward direction, 38, 40, 42, 44 and 46, and which serve a purpose further described below. At the center of seal 30, a shaft opening is defined by a concave double lip 48. Seal 30 is installed and operates as described next.

Referring next to FIG. 2, the normal or unexpanded state of seal 30 is indicated, representing the nominal condition where the air inside housing 20 has been neither heated nor cooled relative to ambient, so that the ambient pressure and the housing 20 internal pressure are substantially balanced. Seal 30 is installed generally between housing 20 and cover 24 with its inner surface facing housing 20 and its outer surface facing the inside of cover 24, hereby enclosing essentially the entire internal volume of housing 20. More specifically, seal 30 is installed by clamping its gasket portion 32 tightly between cover 24 and housing edge 20 when cover 24 is bolted in place. The thickness of gasket portion 32 is tailored to seam 28 so as to clamped with suitable pressure. Shaft 16 passes through the center of seal 30, with a turned down surface 50 thereof riding within double lip 48, which can act as a lubricant reservoir to reduce rubbing friction. A thin baffle plate 52, also clamped between edge 22 and cover 24, separates and protects seal 30 from worm gear 14. Cover 24, unlike a conventional part, does not have an uninterrupted surface, but instead has three openings 54 through the side thereof, each sized similarly to a respective seal bulge portion 36 and aligned therewith. As seal 30 is installed, the entire inner portion 34 is deformed generally downwardly from its free molded state, bending down and flattening out about the flex groove 38. More specifically, the bulge portions 38 are pushed and deformed inwardly along the flex lines 46, 44 and 40 into the concave shape shown in solid lines, while the rest of the seal inner portion 34 is deformed inwardly along the flex grooves 40 and 42, also into a concave shape. Should the internal pressure in housing 20 fall below what it is in FIG. 2, seal 30 would collapse inwardly. In that case, baffle plate 52 would protect seal 30 from worm gear 14.

Figure 6:
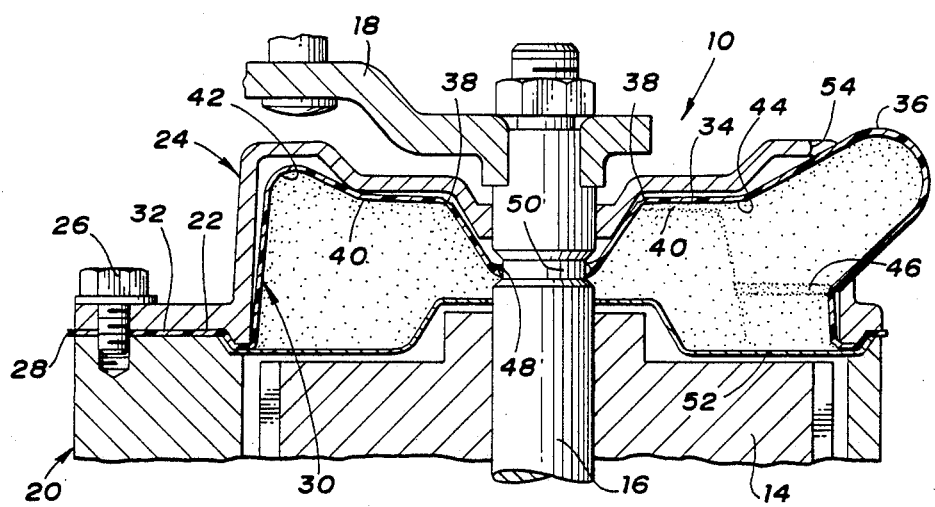
FIG. 6 is a view similar to 2, but showing the seal in the expanded state.

Referring next to FIGS. 3, 6 and 2, when the air within housing 20 expands relative to ambient, due to heating or otherwise, it would, in the conventional case, cause a positive pressure differential relative to ambient, which could cause the expulsion of air out of seam 28, or under the lip 48. With the invention, that potential positive pressure differential can now be compensated for and substantially prevented by an increase in the effective volume enclosed by seal 30. The increase in effective volume results from a general outward expansion of the inner seal portion 34. More specifically, in the embodiment disclosed, the bulge portions 36 expand outwardly, turning inside out, in effect. The bulge portions 36 flex about the flex grooves 44 and 46, changing from the FIG. 2 concave to the FIG. 6 convex shape as they pop out of the cover openings 54. The expanded state of one bulge portion 36 is also shown in dotted lines in FIG. 3. The rest of the seal inner portion 34 also expands outwardly and upwardly, flexing about the flex grooves 40 and 42, although, clearly, most of the increase in volume is provided by the bulge portions 36. As best seen in FIG. 6, the openings 54 through the sides of the cover 24 prevent the bulge portions 36 from interfering with the rotation of crank 18. With the cooling and contraction of the air in the enclosed volume, and the resultant potential negative pressure differential relative to ambient, the seal 30 can return to the FIG. 2 position, thereby preventing the drawing in of ambient air and water vapor at the seam 28. Thus, the seal gasket portion 32 and inner portion 34 cooperate to maintain the integrity of the seal at seam 28. In addition, the outward expansion of the bulge portions 36 would act expel any ambient water that might have condensed and collected therein. The particular change in shape from concave to convex would cooperate well in that process by efficiently shedding any such collected water.

Variations of the preferred embodiment 30 could be made within the broad confines of the invention. The bulge portions 36 could be defined otherwise, as by portions of thinner gauge material. Or, specific bulge portions 36 and large matching cover openings 54 might not be necessary in a situation where a large compensating increase and decrease in effective enclosed volume was not necessary. So long as the inner seal portion 34 was expandable and contractible to a sufficient extent, and so long as some opening through the the cover 24 was large enough to expose the outside of the seal inner portion 34 to ambient pressure, the pressure differential compensation would occur. The seal double lip 48 could be replaced with an inner, stationary gasket portion if a separate bearing were provided in cover 24 for shaft 16 to pass through. Therefore, it will be understood that the invention is not intended to be limited to just the embodiment disclosed.

The embodiments of the invention in which an exclusive property or privilege is claimed are defined as follows:

1. In a housing having an opening defined by an edge to which a cover that engages said edge is attached, thereby creating a seam that represents a potential entry path from ambient to the internal volume of said housing, and in which the air in said internal volume is subject to temperature differentials relative to ambient, an improved seal for protecting said internal volume from the ambient, said seal comprising, a peripheral gasket portion adapted to be tightly clamped between said housing edge and cover to substantially block said seam, an expandable and contractible inner portion integral with said gasket portion located generally between said housing and cover and enclosing said internal volume, and, at least one passage through said cover of sufficient size to expose said seal inner portion to ambient pressure and, whereby, when said temperature differentials occur and the air in said enclosed volume consequently expands and contracts, said seal inner portion can simultaneously expand and contract, increasing and decreasing the effective enclosed volume so as to substantially prevent the occurrence of a pressure differential between ambient and said enclosed volume, thereby cooperating with said gasket portion to help prevent air or water from the ambient from being drawn through said seam boundary and into said enclosed volume.

2. In a housing having an opening defined by an edge to which a cover that engages said edge is attached, thereby creating a seam that represents a potential entry path from ambient to the internal volume of said housing, and in which the air in said internal volume is subject to temperature differentials relative to ambient, an improved seal for protecting said internal volume from the ambient, said seal comprising, a peripheral gasket portion adapted to be tightly clamped between said housing edge and cover to substantially block said seam, an inner portion integral with said gasket portion located generally between said housing and cover and enclosing said internal volume, said seal inner portion further including at least one expandable and contractible bulge portion which, in the normal, unexpanded state, has a concave shape relative to the seal and which, in the expanded state, has a convex shape, and, at least one opening through said cover of a size similar to said seal bulge portion and generally aligned therewith, whereby, when the air in said enclosed volume heats up and consequently expands, said seal bulge portion can simultaneously expand from said concave shape through said opening to said convex shape, increasing the effective enclosed volume so as to substantially prevent the occurrence of a pressure differential between ambient and said enclosed volume, said shape change in said bulge portion as it expands also cooperating to expel any ambient water collected in said bulge portion while it was unexpanded, with said bulge portion returning to said normal shape when the air in said enclosed volume cools, thereby cooperating with said gasket portion to help prevent air or water from the ambient from being drawn through said seam and into said enclosed volume.

* * * * *